United States Patent [19]

Martin

[11] Patent Number: 5,312,081
[45] Date of Patent: May 17, 1994

[54] HINGED DOOR QUICK ACCESS DIP NET HOLDER

[76] Inventor: Gordon C. Martin, 1737 Kirkton, Troy, Mich. 48083

[21] Appl. No.: 982,904

[22] Filed: Nov. 30, 1992

[51] Int. Cl.$^5$ .............................................. F16L 3/10
[52] U.S. Cl. ............................ 248/316.3; 248/316.5; 248/231.5; 248/113; 24/495; 211/89
[58] Field of Search ............ 248/74.2, 74.5, 110, 248/113, 230, 231.5, 316.3, 316.5, 539; 211/65, 66, 68, 89; 24/488, 495, 598.5, 648

[56] References Cited

U.S. PATENT DOCUMENTS

| | | | |
|---|---|---|---|
| 98,756 | 1/1870 | Franklin et al. | 248/113 |
| 573,891 | 12/1896 | Martin | 248/113 |
| 1,761,497 | 6/1930 | Smith | 248/230 X |
| 1,968,462 | 7/1934 | Merhell | 248/316.5 X |
| 4,240,604 | 12/1980 | Brach | 248/316.5 |
| 4,653,716 | 3/1987 | Sakaguchi | 248/316.5 |
| 4,955,574 | 9/1990 | Freier | 248/316.5 |
| 5,094,578 | 3/1992 | Light et al. | 248/74.5 X |

FOREIGN PATENT DOCUMENTS 4140957 6/1992 Fed. Rep. of Germany ... 248/475.1

Primary Examiner—Richard K. Seidel
Assistant Examiner—Clark F. Dexter
Attorney, Agent, or Firm—Leon Gilden

[57] ABSTRACT

A holder apparatus includes a semi-cylindrical housing mounting respective first and second semi-cylindrical doors relative thereto. The housing includes first and second side walls, with each respective side wall including a respective slot medially and orthogonally intersecting the side wall, with each side wall having a door pivotally mounted thereto, with the door of a semi-cylindrical configuration and the door having a leg received within an associated slot. Each door includes a hinge, the hinge having a hinge axle having a projection projecting below a respective door, with each axle having a lug projecting below a respective door for mounting upon a grooved support plate to maintain the door in respective open and closed configuration relative to the semi-cylindrical housing.

2 Claims, 3 Drawing Sheets

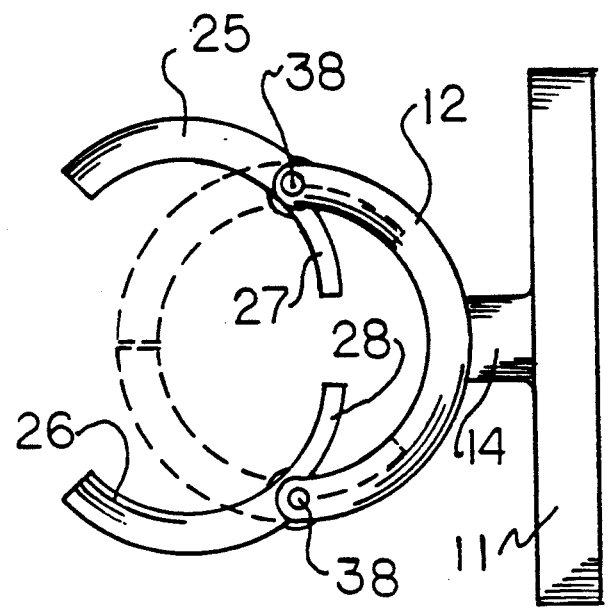
FIG. 11
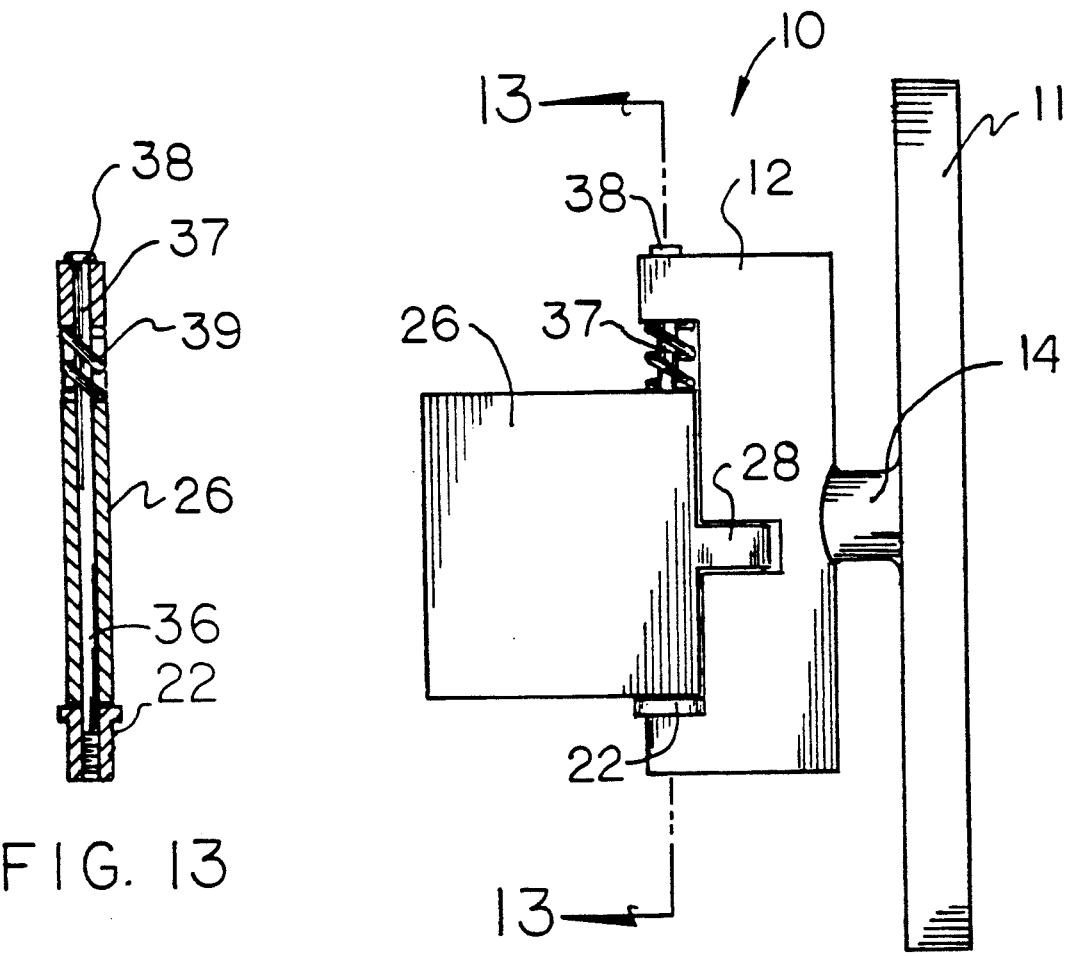
FIG. 13
FIG. 12

HINGED DOOR QUICK ACCESS DIP NET HOLDER

BACKGROUND OF THE INVENTION

1. Field of the Invention

The field of invention relates to quick access dip net holder structure, and more particularly pertains to a new and improved dip net quick access holder apparatus to selectively maintain the organization in a cylindrical or open cylindrical configuration.

2. Description of the Prior Art

Various spring-loaded holder structure has been utilized in the prior art for securing various components, such as indicated in U.S. Pat. No. 3,906,577 to Brucher utilizing a scraper blade holder spring-loaded mounted to a scraper blade shaft structure.

U.S. Pat. No. 4,189,230 to Zasio sets forth work holder structure with spring-loaded work holding means mounted thereon.

The prior art has heretofore failed to provide for a dip net holder arrangement as set forth by the instant invention addressing both the problems of ease of use as well as effectiveness in construction to maintain a dip net holder arranged for mounting to an interior wall of a boat for positioning dip nets in a secure position and permitting quick removal of the dip net relative to the holder structure for use and in this respect, the present invention substantially fulfills this need.

SUMMARY OF THE INVENTION

In view of the foregoing disadvantages inherent in the known types of holder apparatus now present in the prior art, the present invention provides a dip net quick access holder apparatus wherein the same permits the quick release opening of pivoted doors relative to a support housing. As such, the general purpose of the present invention, which will be described subsequently in greater detail, is to provide a new and improved dip net quick access holder apparatus which has all the advantages of the prior art holder apparatus and none of the disadvantages.

To attain this, the present invention provides a holder apparatus including a semi-cylindrical housing mounting respective first and second semi-cylindrical doors relative thereto. The housing includes first and second side walls, with each respective side wall including a respective slot medially and orthogonally intersecting the side wall, with each side wall having a door pivotally mounted thereto, with the door of a semi-cylindrical configuration and the door having a leg received within an associated slot. Each door includes a hinge, the hinge having a hinge axle having a projection projecting below a respective door, with each axle having a lug projecting below a respective door for mounting upon a grooved support plate to maintain the door in respective open and closed configuration relative to the semi-cylindrical housing.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved dip net quick access holder apparatus which has all the advantages of the prior art holder apparatus and none of the disadvantages.

It is another object of the present invention to provide a new and improved dip net quick access holder apparatus which may be easily and efficiently manufactured and marketed.

It is a further object of the present invention to provide a new and improved dip net quick access holder apparatus which is of a durable and reliable construction.

An even further object of the present invention is to provide a new and improved dip net quick access holder apparatus which is susceptible of a low cost of manufacture with regard to both materials and labor, and which accordingly is then susceptible of low prices of sale to the consuming public, thereby making such dip net quick access holder apparatus economically available to the buying public.

Still yet another object of the present invention is to provide a new and improved dip net quick access holder apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 11 is an orthographic top view of the invention with the doors indicated in an opened orientation relative to a closed orientation, as indicated in phantom.

FIG. 12 is an orthographic side view of the invention, as indicated in FIG. 11.

FIG. 13 is an orthographic view, taken along the lines 13—13 of FIG. 12 in the direction indicated by the arrows.

DESCRIPTION OF THE PREFERRED EMBODIMENT

Figure 1:
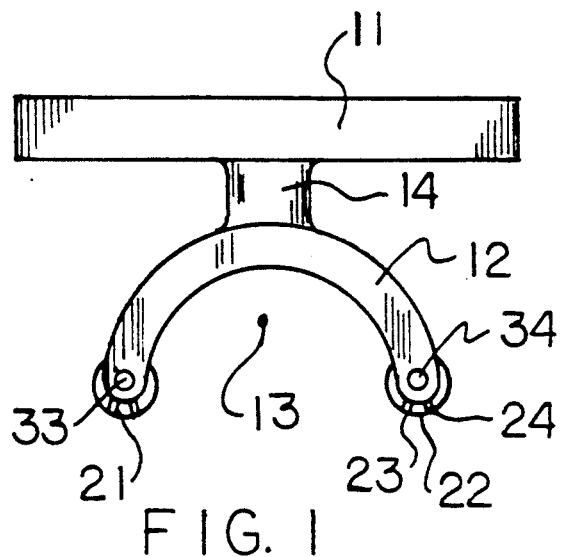
FIG. 1 is an orthographic top view of the housing structure of the invention.

With reference now to the drawings, and in particular to FIGS. 1 to 14 thereof, a new and improved dip net quick access holder apparatus embodying the principles and concepts of the present invention and generally designated by the reference numeral 10 will be described.

Figure 4:
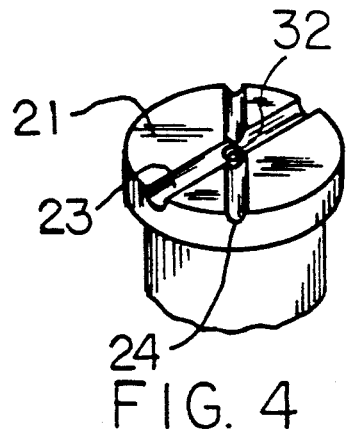
FIG. 4 is a perspective view, taken along the lines 4—4 of FIG. 2 in the direction indicated by the arrows.
Figure 2:
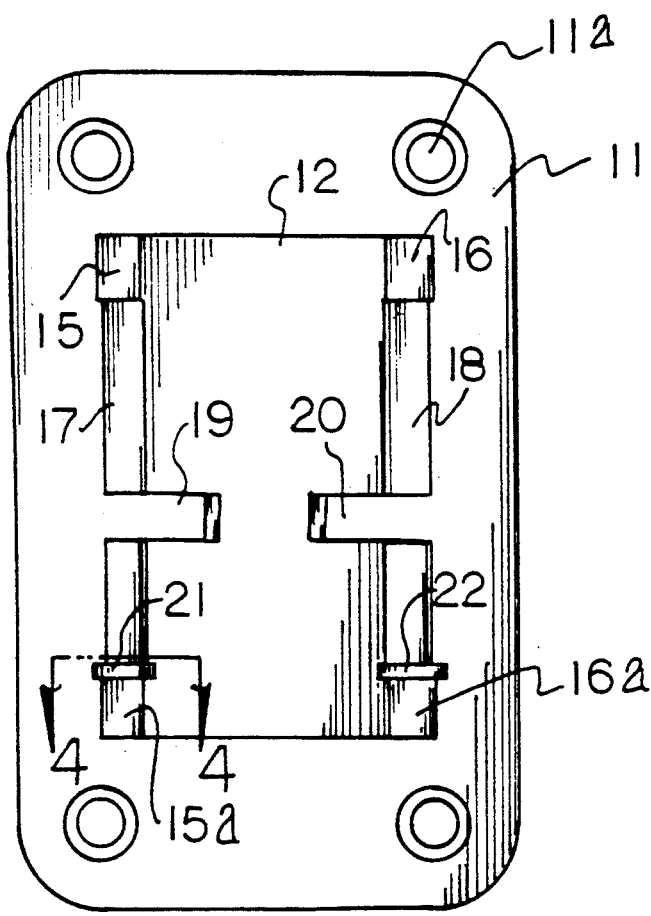
FIG. 2 is an orthographic frontal view of the housing structure.
Figure 3:
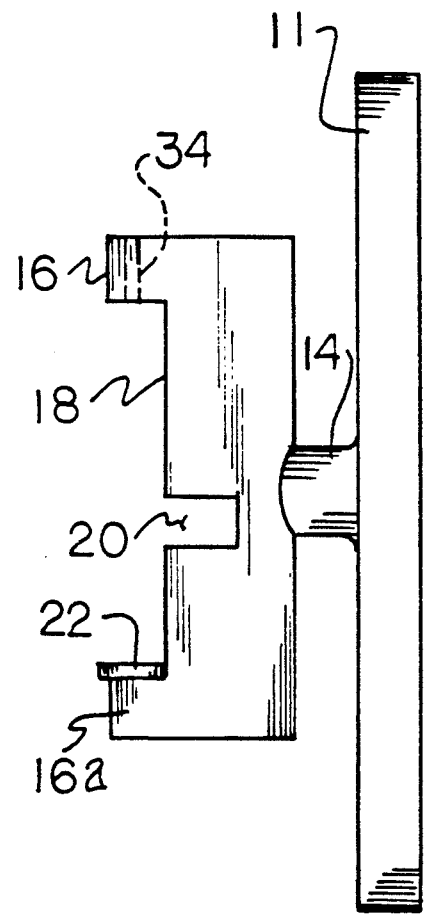
FIG. 3 is an orthographic side view of the housing structure.
Figure 5:
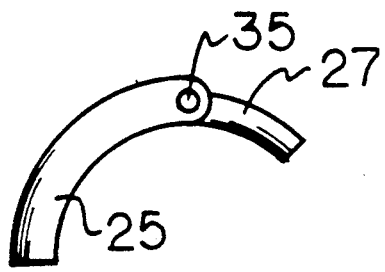
FIG. 5 is an orthographic top view of a first door of the invention.
Figure 7:
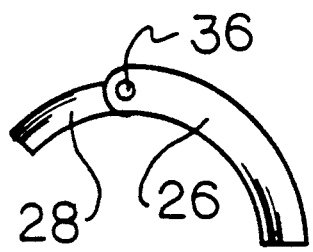
FIG. 7 is an orthographic top view of the second door of the invention.

More specifically, the dip net quick access holder apparatus 10 of the instant invention essentially comprises a mounting plate 11 (see FIGS. 1-3 for example) having a semi-cylindrical housing 12 mounted thereon, wherein the semi-cylindrical housing 12 is symmetrically oriented about a housing axis 13 oriented parallel relative to the mounting plate 11. A positioning rod 14 is orthogonally directed between the mounting plate 11 and the housing 12 to maintain the components in a spaced relationship. A housing first boss 15 and a housing second boss 16 project orthogonally beyond respective first and second sides 17 and 18 of the housing 12 at respective upper distal ends of each of the side walls. Projecting from lower distal ends of the side walls are respective third and fourth bosses 15a and 16a coextensive with the respective first and second bosses 15 and 16. The third boss 15s mounts a first support plate 21 thereon, with a second support plate 22 mounted on the fourth boss 16a. The first and second support plates are coplanar relative to one another and oriented orthogonally relative to the axis 13. A first slot 19 is directed into the housing from the first side wall 17, with a second slot 20 directed into the housing from the second side wall 18. The first and second slots 19 and 20 are annularly aligned relative to one another. As indicated in FIG. 4, each first and second support plate 21 and 22 is formed to include respective first and second grooves 23 and 24 imposed upon a top surface of each support plate, with the first and second grooves 23 and 24 arranged intersecting relative to one another and in confronting relationship to the respective first and second bosses 15 and 16 relative to the first and second support plates 21 and 22, as indicated in FIG. 2 for example. A threaded hole 32 is positioned at the intersection of grooves 23 and 24 for receiving axle shaft 37 as shown in FIG. 13. Between the first and third bosses 15 and 15a is a first semi-cylindrical door plate 25. Similarly, pivotally mounted between the second and fourth bosses 16 and 16a is a second semi-cylindrical door plate 26 (see FIGS. 5-8). The first door plate 25 includes a first door plate top wall 25a spaced from a first door bottom wall 29. The second door 26 includes a second door top wall 26a spaced from a second door bottom wall 30. Each door plate further includes first and second side walls (unnumbered), with the first side wall of the first door plate having an arcuate first door plate alignment leg 27 projecting therefrom arranged for positioning within the first slot 19. The second door plate first side wall includes a second door plate alignment leg 28 arranged for sliding engagement within the second slot 20. The first and second door plate alignment legs 27 and 28 are arranged for slight vertical spacing within the respective first and second slots to permit limited lifting of each door plate relative to each slot, in a manner to be discussed in more detail below.

Figure 6:
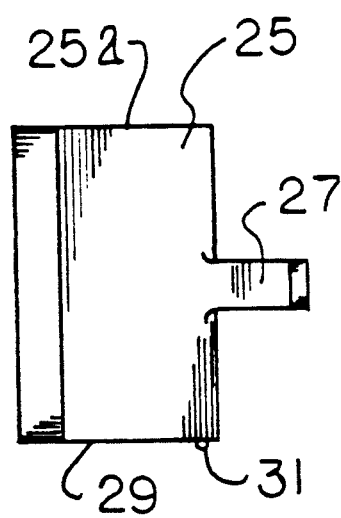
FIG. 6 is an orthographic side view of the first door of the invention.
Figure 8:
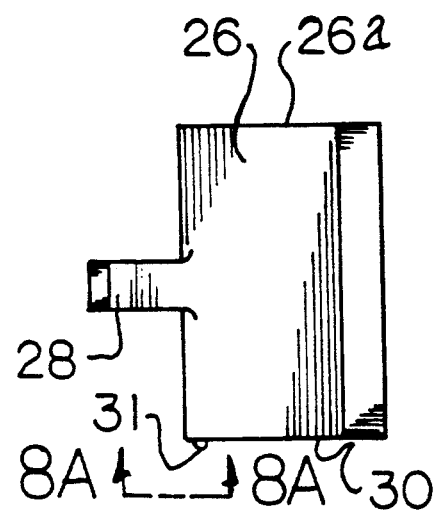
FIG. 8 is an orthographic side view of the second door of the invention.
Figure 8A:
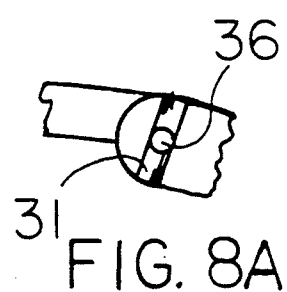
FIG. 8a is an orthographic view, taken along the lines 8a—8a of FIG. 8 in the direction indicated by the arrows.
Figure 9:
FIG. 9 is an orthographic view of a spring member utilized by each hinge of the invention.
Figure 10:
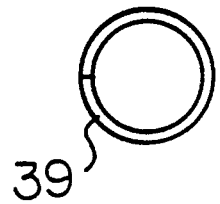
FIG. 10 is an orthographic top view of the spring structure.

As indicated in the FIGS. 6 and 8, an abutment lug 31 projects below the respective first door plate bottom walls 29 and 30 respectively adjacent the first side walls of each door plate. The abutment lugs 31 are arranged for reception within the first and second grooves 23 and 24 of the respective support plates 21 and 22 to maintain the doors in a first closed configuration, as indicated in phantom in FIG. 11, and a second opened position, as indicated by solid line in FIG. 11, wherein the first and second doors second side walls are in a spaced relationship in adjacency relative to one another, as indicated in phantom in FIG. 11.

To this end, parallel to and adjacent each first side wall of the first and second door plates is an axle shaft 37 directed through a respective third and fourth axle bore 35 and 36 of the first and second door plates. First and second axle bores 33 and 34 are coaxially aligned with the respective third and fourth axle bores 35 and 36, with the first and second axle bores 33 and 34 directed through the housing first and second bosses 15 and 16, with the first and second axle bores 33 and 34 orthogonally oriented relative to and medially intersecting the first and second support plates 21 and 22. To maintain the abutment lugs 31 in communication within the respective first and second grooves 23 and 24, a spring member 39 is interposed between each respective door top wall and an associated housing boss, as exemplified in FIG. 12 and FIG. 13. In this manner, the door plates are arranged for contiguous confronting relationship with an associated support plate to maintain the doors in the first and second positions, as indicated in FIG. 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A dip net quick access holder apparatus, comprising,
    a mounting plate, the mounting plate including a positioning rod fixedly mounted to the mounting plate projecting therefrom, and
    a semi-cylindrical housing fixedly mounted on the positioning rod, the housing oriented symmetrically about an axis, and wherein the housing includes a housing first side parallel to and coextensive with a housing second side, the housing first side includes a housing first boss at an upper distal end of the first side, and a housing second boss mounted to an upper distal end of the second side, and a housing third boss spaced from the housing first boss, with the housing third boss at a lower distal end of the first side, and a housing fourth boss fixedly mounted to a lower distal end of the housing second side spaced from the housing second boss, and
    a first arcuate door plate mounted between the first boss and the third boss, and
    a second arcuate door plate mounted between the second boss and the fourth boss, and
    the housing first side includes a first slot, with the housing second side having a second slot, wherein the first slot and the second slot are arranged in an annularly aligned relationship medially intersecting the first side and the second side, and wherein the first door plate includes a first door plate first side and a first door plate second side, the second door plate includes a second door plate first side and a second door plate second side, the first door plate first side includes a first door alignment leg projecting from the first door plate first side, and the second door plate first side includes a second door plate alignment leg projecting therefrom, wherein the first door plate alignment leg is received within the first slot, and the second door plate alignment leg is received within the second slot for alignment of the first door plate and the second door plate relative to the housing, and support means on the first side and the second side of the housing for pivotally supporting the first and second arcuate door plates, respectively, on the housing.

2. An apparatus as set forth in claim 1 wherein the support means includes a first axle directed through the first boss, through the first door plate parallel to and adjacent the first door plate first side and received in the third boss, and a second axle directed through the second boss, through the second door plate adjacent to and parallel the second door plate first side and received in the fourth boss, and a plurality of spring members including at least one spring member mounted between the first door plate and the first boss, and a further one of said spring members mounted between the second door plate and the second boss, and the third boss includes a first support plate orthogonally oriented relative to the axle, and the fourth boss includes a second support plate orthogonally mounted to the axis, wherein the first support plate and the second support plate are coplanar relative to one another, and the first support plate and the second support plate each include a plurality of intersecting grooves and a hole positioned at the intersection of the grooves receiving the first axle and the second axle, respectively, and the first door plate includes a first abutment lug interfitted with the grooves of the first support plate, and the second door plate includes a second abutment lug interfitted with the grooves of the second support plate.

* * * * *